United States Patent [19]
Parsons

[11] Patent Number: 5,987,711
[45] Date of Patent: Nov. 23, 1999

[54] ROPE CLAMP

[75] Inventor: Llewellyn Bertram Parsons, Barrie, Canada

[73] Assignee: 1217145 Ontario Inc., Barrie, Canada

[21] Appl. No.: 09/188,320

[22] Filed: Nov. 10, 1998

[30] Foreign Application Priority Data

Dec. 8, 1997 [CA] Canada ................................. 2224363

[51] Int. Cl.⁶ .................................................. F16G 11/00
[52] U.S. Cl. ............................. 24/130; 114/218; 403/211
[58] Field of Search ............................. 114/218; 24/130, 24/129 R, 127, 129 D, 136 R, 136 K, 115 M, 115 K, 132 R; 403/211

[56] References Cited

U.S. PATENT DOCUMENTS

| | | | |
|---|---|---|---|
| 2,608,731 | 9/1952 | Summers | 114/218 X |
| 3,233,934 | 2/1966 | Osborn et al. | 114/218 |
| 3,574,900 | 4/1971 | Emery | 24/130 |
| 4,361,938 | 12/1982 | Emery | 24/130 |
| 5,522,120 | 6/1996 | Brinning | 24/130 |
| 5,806,452 | 9/1998 | Benoit | 114/218 |

FOREIGN PATENT DOCUMENTS 2451514  11/1980  France ................................. 24/130

*Primary Examiner*—James R. Brittain
*Assistant Examiner*—Robert J. Sandy
*Attorney, Agent, or Firm*—Jane Parsons

[57] ABSTRACT

A rope clamp is provided which is suitable either for use to hang adjustably an article suspended by a rope, or to act as an adjustable tie down. The clamp has a clamping rope channel between a pair of parallel plates. Clamping ribs are located in the rope channel to grip the rope frictionally and to narrow the channel towards its base. One plate of the pair narrows towards one end to leave exposed parts of an inner face on the other plate. Guide to maintain the rope in the rope channel are located on the exposed parts.

6 Claims, 6 Drawing Sheets

ROPE CLAMP

BACKGROUND OF THE INVENTION

1. Field of the Invention

This invention relates to a rope clamp which may be fixed firmly to an article such as a horizontal rail or a truck box, the rope clamp acting to clamp the rope firmly in one position while allowing easy adjustment of the rope.

2. Acknowledgement of Prior Art

Such a rope clamp may be used where frequent adjustments of the rope are required, for example for suspension of a boat fender. Boat fenders are often suspended from a horizontal rail of a boat to dangle against the side of the boat so as to protect the side of the boat from damage when approaching a dock or other structure. The length of the rope between the horizontal rail of the boat and the fender is dependent upon the level of the dock or other structure and may need adjustment for structures at different levels. Moreover, the setting of such fenders must frequently be readjusted since they are frequently untied and brought inboard when not required for use.

Another example of a situation where easy adjustment of the rope clamp is required with firm clamping of the rope between adjustments, is for progressive tightening of a tyer by means of frictional clamping of webbing positioned in a tortuous path so that, in one position, friction of the webbing against itself prevents loosening of the tyer and, in another position, the tyer may be tightened.

Various devices are available for winding webbing in a tortuous path for use as tie-downs but all of those known to the applicants require careful slotting of the webbing through a buckle in a preset path. Some devices are available as adjustable clamps for ropes. Exemplary of adjustable rope clamps are those described in U.S. Pat. No. 5,339,498 issued to Llewellyn Parsons on Aug. 23, 1994 and U.S. Pat. No. 5,596,791 issued to Llewellyn Parsons on Jan. 28, 1997. Of these, U.S. Pat. No. 5,339,498 describes a rope clamp in which the rope is looped around an object and is allowed to pull freely through the clamp in one direction but is held against movement in the other direction. The rope clamp of U.S. Pat. No. 5,596,791 is a rail fender hanger which hangs loosely on a horizontal rail to adjustably clamp a rope therein.

SUMMARY OF THE INVENTION

According to the present invention there is provided a rope clamp comprising a back plate and an integral front plate parallel to the back plate and narrowing towards one end to expose two exposed parts of an inner face of the back plate one to either side of said one end, the back plate and the front plate defining a rope channel between them, inner faces of the front plate and the back plate being provided with converging clamping ribs to narrow the rope channel between them; and an entry guide on one of the exposed parts of the back plate to define a rope entry path into the rope channel, an exit rope guide on the other of said exposed parts of the back plate to define a rope exit path from the rope channel, the rope guide having openings thereinto to allow manual disengagement therefrom or engagement thereinto of a bight of rope.

Attachment means may be provided to attach the clamp to a rail or flat surface. Attachment means for a rail may be a shaped elongate bracket attachable at each end to the back plate of the clamp. For a flat surface, the attachment means may be screws or bolts.

Preferably the rope guides confine a bight of rope into a U with the web of the U lying in the base of the rope channel where the clamping ribs come together.

Each guide may be a lug having its root on a line at right angles, or approximately at right angles, to an end of the rope channel, the lug upstanding from the back extension plate and bent over to confine the rope. The distal end of each lug is free so that the bight of rope may be tucked behind it.

The front panel may end abruptly at the base of the rope channel but, preferably, it extends beyond said base and is directed rearwardly so that its front surface merges with the back panel.

As it extends, it may narrow to a point merging with the back panel between and behind the distal ends of the lugs so that it forms shoulders directed towards the lugs helping to inhibit escape of the rope from behind them.

BRIEF DESCRIPTION OF THE DRAWINGS

Embodimens of the invention will now be described by way of example with reference to the drawings, in which.

DETAILED DESCRIPTION OF A PREFERRED EMBODIMENT

Figure 1:
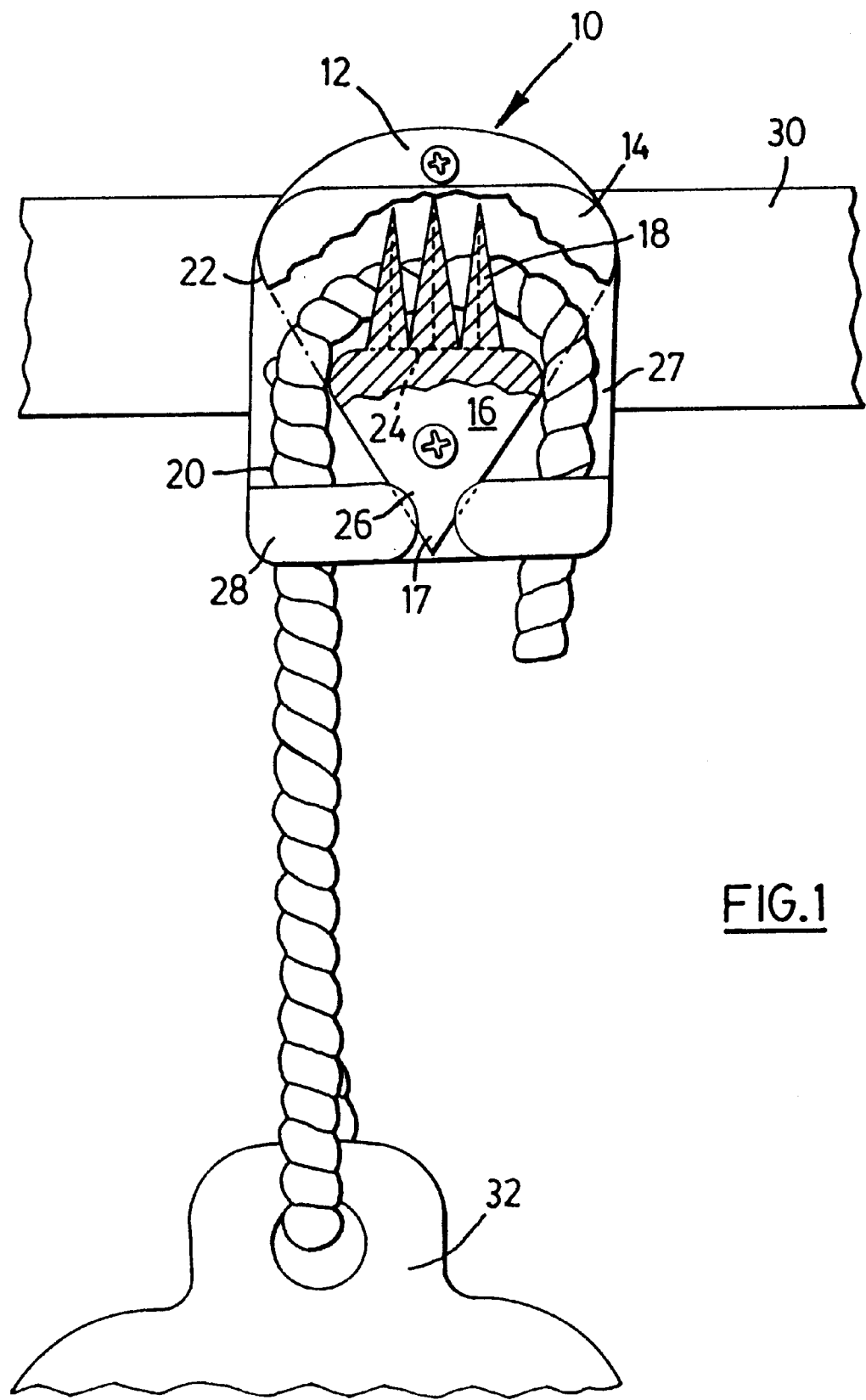
FIG. 1 illustrates a rope clamp according to the invention used as a rope clamp for a fender hanger.

The drawings show a rope clamp 10 comprising a back plate 12 integrally moulded with a front plate 14 through an integral portion 16. The front plate 14 is spaced from the back plate 12 by a distance corresponding roughly to the diameter of a rope to be clamped in the clamp. Front plate 14 is generally parallel to back plate 12 at least in so far as their outer faces are concerned. The inner faces of front plate 14 and back plate 12 are provided with converging clamping ribs 18 which come together at integral portion 16 to form Vs. A rope 20 fits easily and loosely into the upper open part of the V and may be clamped firmly by the lower part of the V by the clamping ribs 18. Thus a channel 22 is formed between the front plate 14 and the back plate 12 narrowed towards its base 24 by the converging ribs 18. The base 24 lies along an edge of integral portion 16.

The front plate 14 narrows towards one end 26 to expose portions 27 of an inner surface of back plate 12.

Integral portion 16 extends away from base 24 of rope channel 22 as the front plate narrows to a point 17 at an edge of extension 26 having passed behind bent over portions 29

Figure 6:
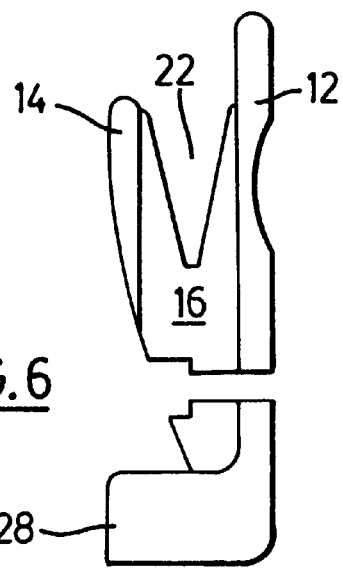
FIG. 6 is a side view of the rope clamp of FIGS. 1 and 2 similar to the side view of FIG. 4 but with the rope not in position.

(see FIG. 7) of guide lugs 28. Guide lugs 28 are upstanding from back plate 12 at roots on a vertical line from respective ends of rope channel 22. The guide lugs 28 bend over to confine the rope between each lug and the back plate 12. As is best seen in FIGS. 4 and 6 the guide lugs 28 may be curved to conform with the shape of the rope to better confine the rope behind them.

Figure 4:
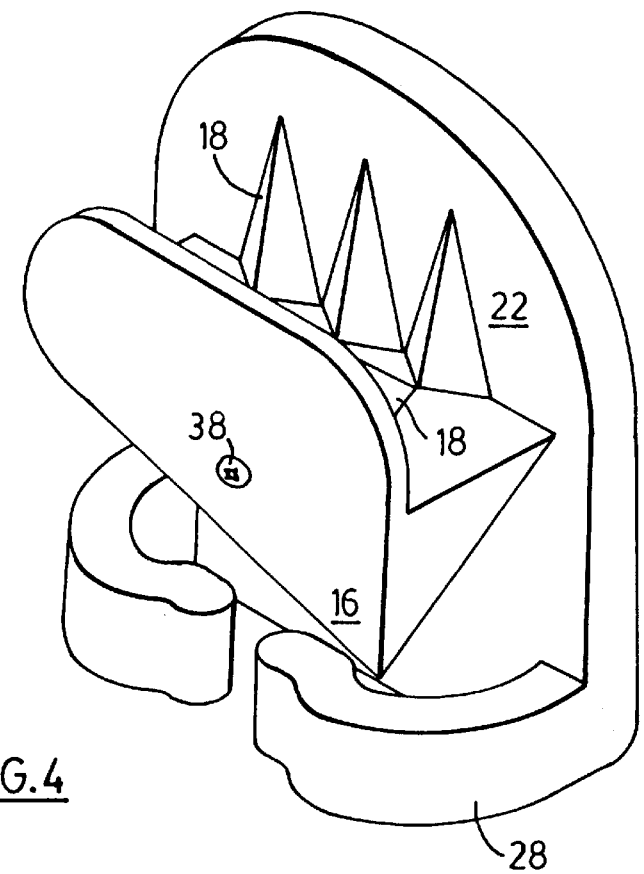
FIG. 4 is a perspective view of the rope clamp.

The actual three dimensional shape of rope clamp 10 may possibly be best seen from the perspective view of FIG. 4.

FIG. 1 shows the rope clamp attached to a horizontal rail 30 to be used as a fender hanger for fender 32. Rope 20 is shown confined behind both guide lugs 28 bent into a U with the web of the U in rope channel 22 clamped by converging clamping ribs 18. The front plate 14 is broken away to show the rope in channel 22.

Figure 2:
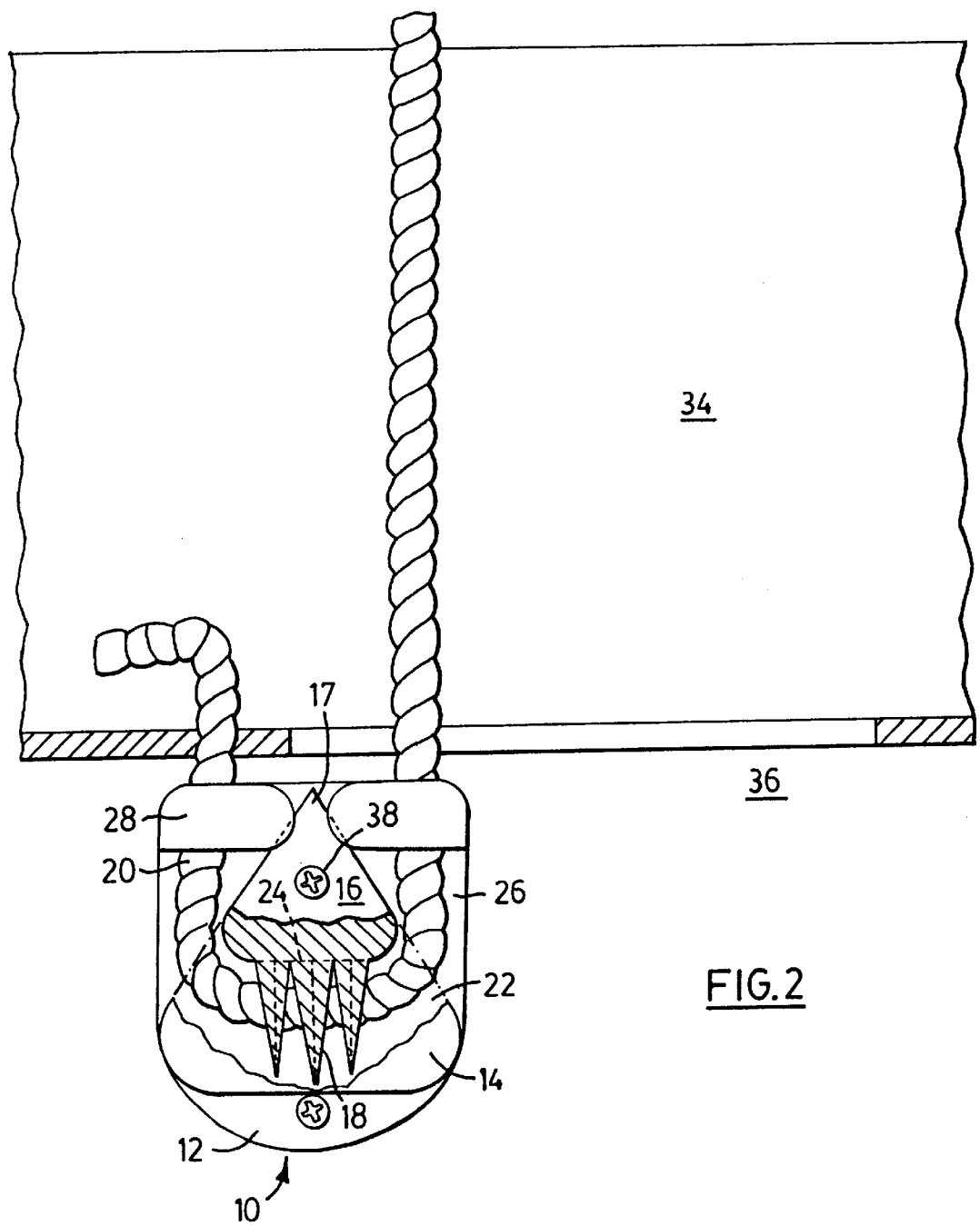
FIG. 2 illustrates the rope clamp of FIG. 1 being used as a tie-down.

FIG. 2 shows a similar rope clamp to that of FIG. 1 but it is being used as a tie-down for a box 34 on trailer or truck. As illustrated the clamp is attached to the trailer or truck box 36 by means of bolts or screws 38.

Figure 3:
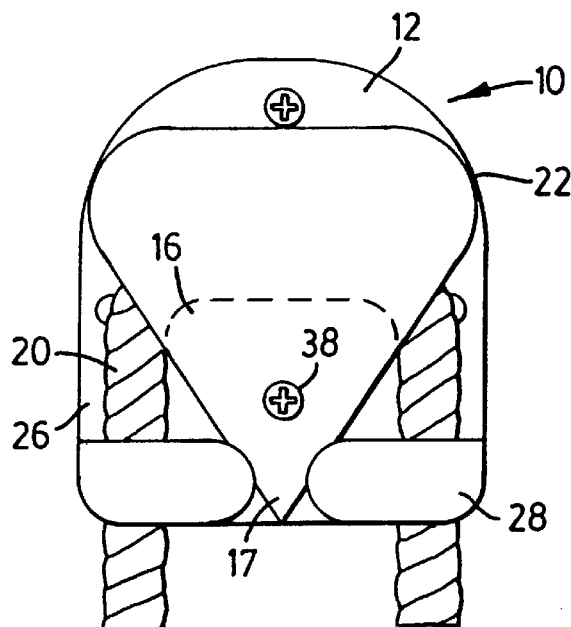
FIG. 3 is a plan view of the rope clamp of FIGS. 1 and 2.
Figure 5:
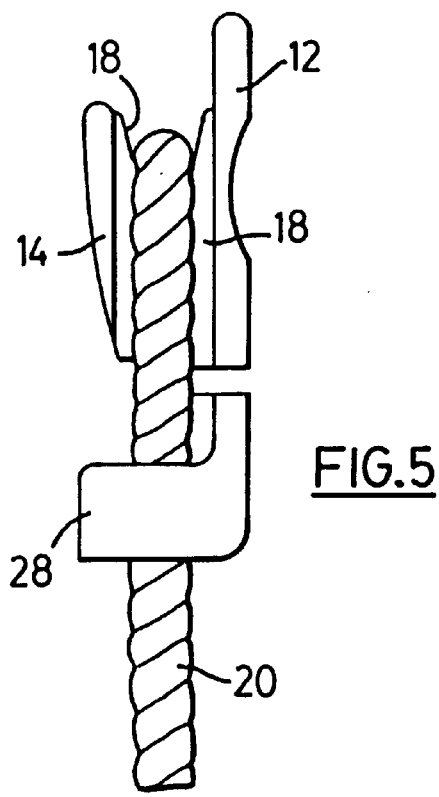
FIG. 5 is a side view of the rope clamp of FIGS. 1 and 2 with the rope in position.
Figure 7:
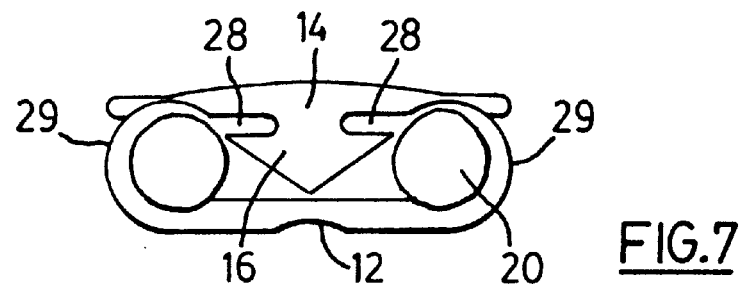
FIG. 7 is a bottom view.

FIGS. 3, 4, 5, 6 and 7 show the rope clamp of FIGS. 1 and 2 in greater detail. FIG. 3 shows the rope clamp 10 without the cut away portion of the front plate and shows the rope 20 in clamped position in the device. FIG. 4 shows the perspective view of the rope clamp 10. FIGS. 5 and 6 are side views of the clamp 10 with the rope clamped in the device in FIG. 5 and without the rope in FIG. 6. The V-shaped groove of the rope channel 22 can clearly be seen in FIG. 6. FIG. 7 shows a view from the bottom showing how the lugs 28 curve around the rope to bias it into U formation to be clamped between the converging clamping ribs 18.

The sizes and preferred angles and orientations of the rope clamp differ somewhat for different size of rope but, for rope of say, up to ½ inch in diameter preferred dimensions may be as follows: the angle of the V between the converging ribs may be 7°. The front plate 14 narrowing into integral portion 16 may be roughly triangular in shape, the integral portion 16 extending to a point 17. The front surface of integral portion 16 slopes rearwardly towards back plate 12 to merge with it at point 17 leaving clearance between the sloping surface and guide lugs 28 to allow access of rope 20. This may best be seen in FIG. 4 and 6. The merging point 17 may be the apex of the two converging edges of the front plate 14 together with the integral portion 16 which may be at 60° to each other. The back plate 12 may have parallel sides, the guide lugs 28 extending from it at an end of its extension 26. The point 17 of the integral portion 16 may be arranged symmetrically between the lugs at the edge of the extension.

Figure 8:
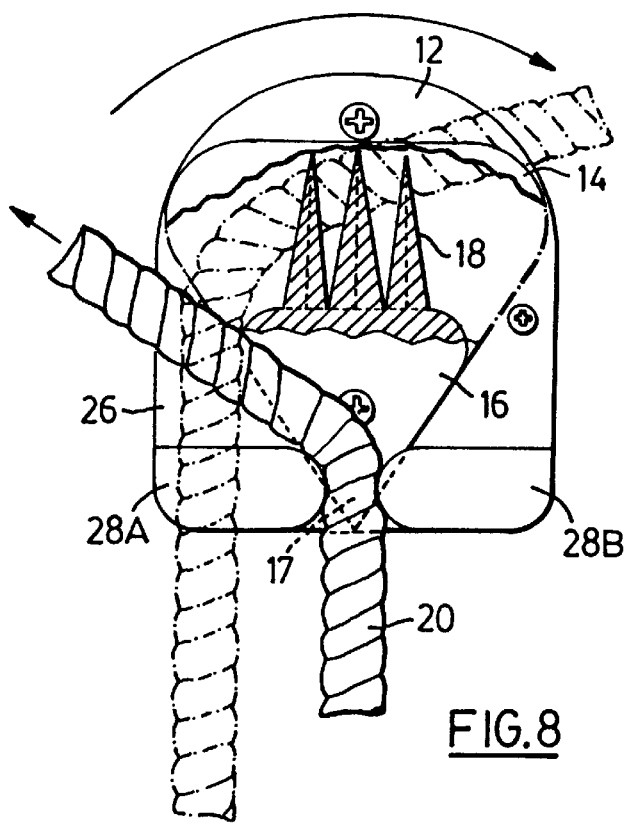
FIGS. 8 and 9 show the method of using the rope clamp of FIGS. 1 and 2.
Figure 9:
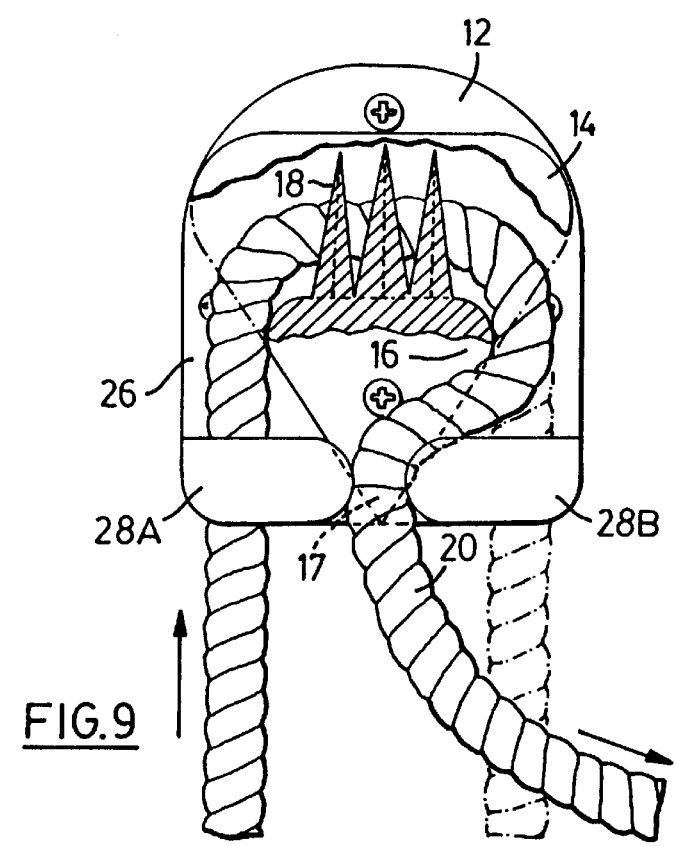

The manner of inserting the rope into clamped position is shown in FIGS. 8 and 9. A bight of entry rope 20 may be inserted between the entry guide lug 28A either freely or by biassing the guide lugs slightly away from front plate 14. The rope 20 is moved from the initial position shown in solid lines in FIG. 8 to the position shown in broken lines. At this point the front plate 14 has merged with back plate 12 leaving clearance between front plate 14 and bent over portions 29 of lugs 28 for insertion of the rope. The rope may be adjusted behind entry guide lug 28A adjacent the side edge of back plate 26. It may then be adjusted in position by pulling it or allowing it to fall while holding the bight of rope away from the clamping ribs 18. When the desired position is attained, the bight of rope is looped between front plate 14 and back plate 12 between clamping ribs 18. In this position the rope is held firmly by the clamping ribs 18 but unless the final direction of the exiting rope is constrained from movement away from the clamping ribs 18, there may be a possibility of loosening the clamping action. For this reason, the rope is inserted behind the bent over portion 29 of exit guide lug 28B and positioned in its exit position behind exit guide lug 28B adjacent the other edge of back plate 12. The final position is as shown by the broken lines in FIG. 9.

When it is desired to adjust the rope 20, it is unlatched from its exit position behind exit lug 28B, and moved into the wider portion of the rope channel 22. For easier adjustment rope 20 is moved into the position shown in solid lines in FIG. 8. In this position the rope can move freely to loosen or tighten it. When the desired adjustment is achieved it is returned to lodge in clamped position in clamping ribs 18 to exit behind lug 28B.

Figure 10:
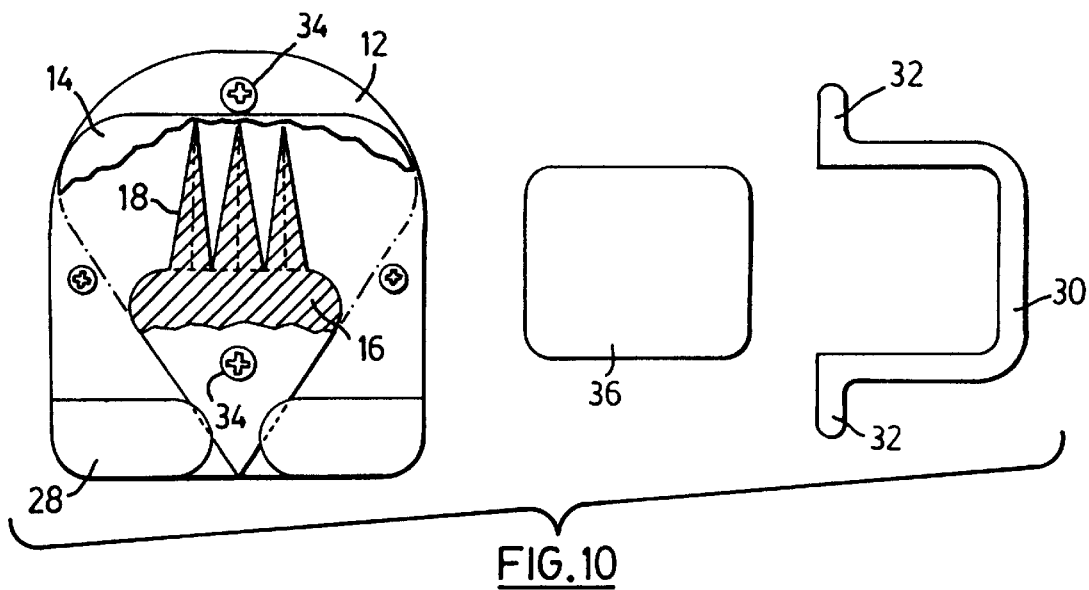
FIG. 10 shows the rope clamp as illustrated with FIGS. 1 and 2 in combination with a square horizontal rail and means to attach the clamp to the rail.
Figure 11:
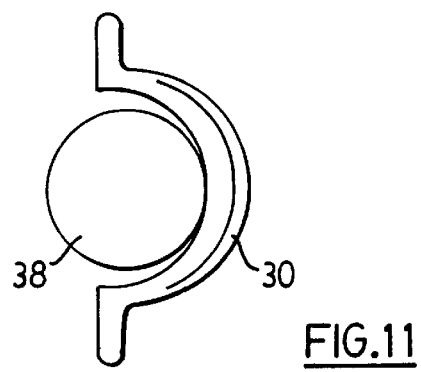
FIG. 11 is a view similar to that of FIG. 9 but showing the rope clamp fixed to a round rail.

When the rope clamp is to be attached to a rail it may conveniently be so attached by means of the clamps shown in FIGS. 10 and 11. FIG. 10 shows a clamp for a square rail 36. The clamp comprises an elongate bar or strap 30 or generally U-shaped configuration to conform with the shape of the rail. The distal ends of the legs of the U have flanges 32 including apertures to take bolts. The clamp is arranged about the rail and bolts 34 are inserted through the apertures of flanges 32 and through the rope clamp 10. One of the bolts is located to pass through the integral portion 16 since this is the strongest part of the clamping device. The other bolt passes through back plate 12. Back plate 12 may be extended beyond front plate 14 at this point to allow easy access to the bolt. When the rail is a round rail 38 as seen in FIG. 12 the elongate portion 30 has different configuration as shown in FIG. 11.

I claim:

1. A rope clamp comprising:
    a back plate; and
    an integral front plate parallel to the back plate and narrowing towards one front plate end to expose two exposed parts of an inner face of the back plate, one of said two exposed parts lying to either side of said one front plate end, the back plate and the front plate defining a rope channel between them, an inner face of the front plate and an inner face of the back plate being provided with converging clamping ribs to narrow the rope channel between them;
    an entry rope guide on one of the exposed parts of the back plate to define a rope entry path into the rope channel;
    an exit rope guide on the other side of said exposed parts of the back plate to define a rope exit path from the rope channel, each of the entry rope guide and the exit rope guide having openings thereinto to allow manual disengagement therefrom or engagement thereinto of a bight of rope; and
    each of the entry rope guide and the exit rope guide comprises a lug upstanding from an edge of the back plate and having a bent over portion lying parallel with one of said exposed parts of the inner face of the back plate.

2. A rope clamp as claimed in claim 1 in which the rope guides are positioned to confine a bight of rope into a U-shape having a web and legs, with the web of the U lying in the rope channel and the legs of the U lying respectively in the entry and exit paths.

3. A rope clamp as claimed in claim 2 in which the integral front plate narrows at said one front plate end to a point merging with the back panel between distal ends of the bent over portions of the rope guides.

4. A rope clamp as claimed in claim 1 having attachment means to attach the back plate to a support.

5. A rope clamp as claimed in claim 4 in which the back plate is directly attachable to a support by screws or bolts.

6. A rope clamp as claimed in claim 4 in which the attachment means comprises a bracket having a shape conforming to the shape of a support rail and attachable to the back plate by screws or bolts.

* * * * *